(12) United States Patent
McCullough et al.

(10) Patent No.: US 6,890,876 B2
(45) Date of Patent: May 10, 2005

(54) PROCESSES FOR PRODUCING FLUORIDED CATALYSTS FROM NITROGENOUS METALLOCENES

(75) Inventors: Laughlin G. McCullough, League City, TX (US); Donna Jean Crowther, Seabrook, TX (US)

(73) Assignee: Univation Technologies, LLC, Houston, TX (US)

( * ) Notice: Subject to any disclaimer, the term of this patent is extended or adjusted under 35 U.S.C. 154(b) by 71 days.

(21) Appl. No.: 10/647,600

(22) Filed: Aug. 25, 2003

(65) Prior Publication Data

US 2004/0102590 A1 May 27, 2004

Related U.S. Application Data

(60) Provisional application No. 60/429,226, filed on Nov. 26, 2002.

(51) Int. Cl.$^7$ ............... C08F 4/76; C08F 4/74
(52) U.S. Cl. ............. 502/152; 502/162; 526/170; 526/172
(58) Field of Search ............... 502/152, 162; 526/170, 172, 160

(56) References Cited

U.S. PATENT DOCUMENTS

| | | | |
|---|---|---|---|
| 3,896,179 | A | 7/1975 | Resnick ............... 260/616 |
| 4,874,880 | A | 10/1989 | Miya et al. ............ 556/53 |
| 5,589,549 | A | * 12/1996 | Govoni et al. ......... 525/247 |
| 2002/0032287 | A1 | 3/2002 | McCullough ........... 526/68 |
| 2002/0052446 | A1 | * 5/2002 | Becke et al. ........... 525/192 |

FOREIGN PATENT DOCUMENTS

| | | |
|---|---|---|
| DE | 4332009 A1 | 3/1995 |
| EP | 0200351 A2 | 11/1986 |
| EP | 0705849 A1 | 4/1996 |
| WO | WO 97/07141 | 2/1997 |

OTHER PUBLICATIONS

W. Kaminsky, et al., *Fluorinated Half–Sandwich Complexes as Catalysts in Syndiospecific Styrene Polymerization*, 30(25) Macromolecules 7647–7650 (1997).

E.F. Murphy, et al., *Synthesis and spectroscopic characteriation of a series of substituted cyclopentadienyl Group 4 fluorides; crystal structure of the acetylacetonato complex* [(acac)$_2$($\eta^5$–C$_5$Me$_5$)Zr($\mu$–F)SnMe$_3$Cl], Dalton, 1983 (1996).

Ashby, et al., *The Preparation of Organomagnesium Fluorides by Organometallic Exchange Reactions*, Journal of Organometallic Chemistry, 72 (1974) 11–20.

E.F. Murphy et al. in *Organometallic Fluorides: Compounds Containing Carbon—Metal—Fluorine. Fragments of d–Block Metals*, 97 Chem. Rev. 3425–3468 (1997).

Antinolo, et al., *Metallocene Derivatives of Early Transition Elements, Part 4, Sunthesis and Crystal Structures of a Series of Zirconocene (iv) Halides* [Zr($\beta$–C$_5$H$_4$SiMe$_3$)$_2$X$_2$] (X=Cl or Br) and ([Zr[$\beta$–C$_5$H$_3$(SiMe$_3$)$_2$–1,3]$_2$X$_2$]X$_2$] (X=F, Br, or I), J. Chem. Soc. Dalton Trans. (1987) 1463–1472.

F. Garbassi, et al., *XPS study of metallocene based catalysts for the polymerization of ethylene*, Journal of Molecular Catalysis A: Chemical 101 199–209 (1995).

A. Herzog, et al., *Reactions of* ($\eta^5$–C$_5$Me$^5$)ZrF$_3$, ($\eta^5$–C$_5$Me$_4$Et)ZrF$_3$, ($\eta^5$–C$_5$M4$_5$)$_2$ZrF$_2$, ($\eta^5$–C$_5$Me$_5$)HfF$_3$, and ($\eta^5$–C$_5$Me$_5$)TaF$_4$ *with AlMe$_3$, Structure of the First Hafnium–Aluminum–Carbon Cluster*, 15 ORGANOMETALLICS 909–917 (1996).

P.M. Druce et al. in *Metallocene Halides: Part I. Synthesis, Spectra, and Redistribution Equilibria of Di–$\pi$–cyclopentadienyl–*Ti(IV), –Zr(IV), and –Hf(IV), 14 J. Chem. Soc. 2106–2110 (1969).

W.W. Lukens, Jr. et al. in *A $\pi$Donor Spectrochemical Series for X in* (Me$_5$C$_5$)$_2$TiX, *and $\beta$–Agostic Interactions in X=Et and N*(Me)Ph, 118 J. Am. Chem. Soc. 1729–1728 (1996).

Z. Xie et al., *Synthesis, Molecular Structure, and Reactivity of Organolanthanide Fluoride Complexes*, [[(Me$_3$Si)$_2$C$_5$H$_3$]$_2$Ln($\mu$–F)]$_2$ (Ln=La, Nd, Sm, Gd) and [(C$_5$H$_5$)$_2$Ln($\beta$–F)(THF)]$_2$ (Ln=Y, Yb), 17 ORGANOMETALLICS 3937–3944 (1998).

* cited by examiner

Primary Examiner—Caixia Lu
(74) Attorney, Agent, or Firm—Kevin M. Faulkner

(57) ABSTRACT

Processes of producing fluorided catalyst compounds and process of producing polyolefins using these catalyst compounds are disclosed. An embodiment of the process includes contacting a nitrogenous metallocene compound with a fluoriding agent, which preferably includes a fluorided anhydrous acid, for a time sufficient to form a fluorided metallocene catalyst compound. An example of the process to produce a fluorided metallocene is:

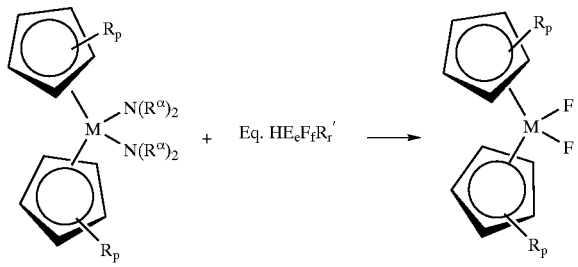

wherein N is nitrogen, R and R$^\alpha$ are groups selected from hydrogen, hydrocarbons, heteroatom-containing hydrocarbons and halides, p can be 0 (if no substituent groups are present on the Cp rings) or an integer from 1 to 5; adjacent R groups can form another ring system (e.g., to form a tetrahydroindenyl or indenyl group); and the other groups are defined as herein; wherein "Eq." are the equivalents of fluoriding agent combined with the nitrogenous metallocene compound ranging from 1 to 10 in one embodiment.

42 Claims, No Drawings

PROCESSES FOR PRODUCING FLUORIDED CATALYSTS FROM NITROGENOUS METALLOCENES

CROSS-REFERENCE TO RELATED APPLICATION

The present application claims priority to Provisional U.S. Patent Application U.S. Ser. No. 60/429,226 filed Nov. 26, 2002.

FIELD OF INVENTION

This application relates to fluorided catalyst compounds, and in particular, to methods of producing fluorided metallocene catalyst compounds; and to the use of these compounds to produce polyolefins.

BACKGROUND

Although much work has been done in olefin polymerization catalysis, there is still a desire to improve the process. In particular, there is a need to provide a practical, commercially viable method of making polyolefins that can utilize the newer "single-site" catalyst components known in the art. There is great interest because, while lab scale processes may afford desirable polymers using, for example, metallocene catalyst components, commercial scale up is often hindered by problems such as reactor fouling. In particular, olefin polymerization reactions catalyzed using single-site catalyst components are often subject to uncontrollable phases, wherein the polymer agglomerates into large (greater than 1 cm) chunks or larger, and can often "sheet" on the inside surface of the reactor, causing, among other problems, a lack of heat removal in the reactor, and further "running away" of the polymerization. In these cases, the reactor must be shut down, resulting in costly delays and lack of commercial viability.

A promising class of single-site catalysts for commercial use includes those wherein the metal center has at least one extractable fluorine (or fluorine "leaving group"). Disclosures of such catalysts include US 20020032287; WO 97/07141; DE 43 32 009 A1; EP-A2 0 200 351; EP-A1 0 705 849; E. F. Murphy, et al., *Synthesis and spectroscopic characterization of a series of substituted cyclopentadienyl Group 4 fluorides; crystal structure of the acetylacetonato complex* [(acac)$_2$($\eta^5$-C$_5$Me$_5$)Zr($\mu$-F)SnMe$_3$Cl], DALTON, 1983 (1996); A. Herzog, et al., *Reactions of* ($\eta^5$-C$_5$Me$_5$) ZrF$_3$, ($\eta^5$-C$_5$Me$_4$Et)ZrF$_3$, ($\eta^5$-C$_5$M4$_5$)$_2$ZrF$_2$, ($\eta^5$-C$_5$Me$_5$) HfF$_3$, and ($\eta^5$-C$_5$Me$_5$)TaF$_4$ with AlMe$_3$, Structure of the First Hafnium-Aluminum-Carbon Cluster, 15 ORGANOMETALLICS 909–917 (1996); F. Garbassi, et al., JOURNAL OF MOLECULAR CATALYSIS A: CHEMICAL 101 199–209 (1995); and W. Kaminsky, et al., *Fluorinated Half-Sandwich Complexes as Catalysts in Syndiospecific Styrene Polymerization*, 30(25) MACROMOLECULES 7647–7650 (1997). Use of such single site catalyst components in a olefin polymerization system is desirable, especially in gas-phase polyethylene polymerization.

With the growing use of such catalysts, there is a need to provide a practical method of making such catalysts. Typically, the production of the fluorine-containing catalyst component, or "fluorided" catalyst component, entails the reaction of a fluoriding agent with the corresponding "chlorided" catalyst component. The use of some common fluoriding agents presents many challenges, excessive cost among them. Other methods of fluoriding metallocene catalyst components are disclosed by Z. Xie et al., *Synthesis, Molecular Structure, and Reactivity of Organolanthanide Fluoride Complexes*, [{(Me$_3$Si)$_2$C$_5$H$_3$}$_2$Ln($\mu$-F)]$_2$ (Ln=La, Nd, Sm, Gd) and [(C$_5$H$_5$)$_2$Ln($\mu$-F)(THF)]$_2$ (Ln=Y, Yb), 17 ORGANOMETALLICS 3937–3944 (1998); E. F. Murphy et al. in *Organometallic Fluorides: Compounds Containing Carbon—Metal—Fluorine Fragments of d-Block Metals*, 97 CHEM. REV. 3425–3468 (1997); W. W. Lukens, Jr. et al. in *A $\pi$-Donor Spectrochemical Series for X in (Me$_5$C$_5$)$_2$TiX, and $\beta$-Agostic Interactions in X=Et and N(Me)Ph*, 118 J. AM. CHEM. SOC. 1729–1728 (1996); and P. M. Druce et al. in *Metallocene Halides: Part I. Synthesis, Spectra, and Redistribution Equilibria of Di-$\pi$-cyclopentadienyl-Ti(IV), —Zr(IV), and —Hf(IV)*, 14 J. CHEM. SOC. 2106–2110 (1969). However, these methods fall short of a desirable, cost effective commercial method of making fluorided metallocene catalyst components. What is needed is an improved method of producing fluorided catalyst components that will be more practical and beneficial to commercial olefin polymerization and oligomerization processes. The present invention is directed towards this improvement.

SUMMARY

The present invention is directed to a process of producing a fluorided metallocene catalyst component comprising contacting a nitrogenous metallocene compound with a fluoriding agent for a time sufficient to form a fluorided metallocene catalyst compound; and also to a process of producing polyolefins, polyethylene in a particular embodiment, by combining the fluorided metallocene compound of the invention with olefin monomers to produce a polyolefin.

In one embodiment, the nitrogenous metallocene catalyst compound is described by the formulae:

$\text{Cp}^A\text{Cp}^B\text{MX}_n$ and $\text{Cp}^A(\text{A})\text{Cp}^B\text{MX}_n$ wherein M is a Group 4, 5 or 6 atom;

Cp$^A$ and Cp$^B$ are each bound to M and are the same or different and are selected from the group consisting of cyclopentadienyl, indenyl, tetrahydroindenyl, fluorenyl, and substituted derivatives of each;

(A) is a divalent bridging group bound to each of Cp$^A$ and Cp$^B$;

n is 0, 1 or 2; and

X is selected from the group consisting of amides, amines, imines, nitrites and combinations thereof.

In a particular embodiment, the fluorided metallocene catalyst compound is useful in producing polyethylene resins having a density in the range of from 0.880 to 0.925 g/cm$^3$; and in another embodiment, the fluorided metallocene catalyst compound is useful, especially when combined with another catalyst compound, in producing polyethylene resins having a density in the range of from 0.930 to 0.970 g/cm$^3$; the resins useful for such applications as films, pipes and geomembranes.

DETAILED DESCRIPTION

General Definitions

As used herein, the phrase "catalyst system" includes at least one "catalyst component" and at least one "activator", both of which are described further herein. The catalyst system may also include other components, such as supports, etc., and is not limited to the catalyst component and/or activator alone or in combination. The catalyst system may include any number of catalyst components in any combination as described herein, as well as any activator in any combination as described herein. Desirably, the catalyst system of the present invention includes the fluorided metallocene catalyst compound, an activator, and a support material.

As used herein, the phrase "catalyst compound" includes any compound that, once appropriately activated, is capable of catalyzing the polymerization or oligomerization of olefins, the catalyst compound comprising at least one Group 3 to Group 12 atom, and optionally at least one leaving group bound thereto. In a desirable embodiment, the catalyst compound is a fluorided metallocene catalyst compound as described herein.

As used herein, the phrase "leaving group" refers to one or more chemical moieties bound to the metal center of the catalyst component that can be abstracted from the catalyst component by an activator, thus producing the species active towards olefin polymerization or oligomerization. The activator is described further below.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press $81^{st}$ ed. 2000).

As used herein, a "hydrocarbyl" includes aliphatic, cyclic, olefinic, acetylenic and aromatic radicals (i.e., hydrocarbon radicals) comprising hydrogen and carbon that are deficient by one hydrogen. A "hydrocarbylene" is deficient by two hydrogens.

As used herein, an "alkyl" includes linear, branched and cyclic paraffin radicals that are deficient by one hydrogen. Thus, for example, a —$CH_3$ group ("methyl") and a $CH_3CH_2$— group ("ethyl") are examples of alkyls.

As used herein, an "alkenyl" includes linear, branched and cyclic olefin radicals that are deficient by one hydrogen; alkynyl radicals include linear, branched and cyclic acetylene radicals deficient by one hydrogen radical.

As used herein, "aryl" groups includes phenyl, naphthyl, pyridyl and other radicals whose molecules have the ring structure characteristic of benzene, naphthylene, phenanthrene, anthracene, etc. For example, a $C_6H_5^-$ aromatic structure is an "phenyl", a $C_6H_4^{2-}$ aromatic structure is an "phenylene". An "arylalkyl" group is an alkyl group having an aryl group pendant therefrom, examples of which include benzyl, phenethyl, tolylmethyl and the like; an "alkylaryl" is an aryl group having one or more alkyl groups pendant therefrom, examples of which include tolyl, xylyl, mesityl, cumyl and the like.

As used herein, an "alkylene" includes linear, branched and cyclic hydrocarbon radicals deficient by two hydrogens. Thus, —$CH_2$— ("methylene") and —$CH_2CH_2$— ("ethylene") are examples of alkylene groups. Other groups deficient by two hydrogen radicals include "arylene" and "alkenylene".

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like.

As used herein, "heterocyclic" refers to ring systems having a carbon backbone that comprise from 1 to 3 atoms selected from the group consisting of boron, aluminum, silicon, germanium, nitrogen, phosphorous, oxygen and sulfur, unless the heteroatom (non carbon atom) is described.

As used herein, an "alkylcarboxylate", "arylcarboxylate", and "alkylarylcarboxylate" is an alkyl, aryl, and alkylaryl, respectively, that possesses a carboxyl group in any position. Examples include $C_6H_5CH_2C(O)O^-$, $CH_3C(O)O^-$, etc.

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

As used herein, structural formulas are employed as is commonly understood in the chemical arts; lines ("—") used to represent associations between a metal atom ("M", Group 3 to Group 12 atoms) and a ligand or ligand atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

A certain stereochemistry for a given structure or part of a structure should not be implied unless so stated for a given structure or apparent by use of commonly used bonding symbols such as by dashed lines and/or heavy lines.

Unless stated otherwise, no embodiment of the present invention is herein limited to the oxidation state of the metal atom "M" as defined below in the individual descriptions and examples that follow. The ligation of the metal atom "M" is such that the compounds described herein are neutral, unless otherwise indicated.

Nitrogenous Metallocene Compound

The nitrogenous metallocene compound useful in the present invention is as described herein. Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243–296 (1999) and in particular, for use in the synthesis of polyethylene in 1 METALLOCENE-BASED POLYOLEFINS 261–377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The "nitrogenous metallocene compounds" useful in the present invention are those comprising at least one nitrogenous leaving group or nitrogenous "X" group as described in the formulas and structures below, desirably a Bronsted base.

The metallocene catalyst component is supported on a support material in a particular embodiment as described further below, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind"), substituted versions thereof (as described in more detail below), and heterocyclic versions thereof.

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5 and 6 atoms in yet a more particular embodiment, and a Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are electrically neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In one aspect of the invention, the one or more metallocene catalyst components of the invention are represented by the formula (I):

$$Cp^A Cp^B MX_n \qquad (I)$$

wherein M is as described above; each X is chemically bonded to M; each Cp group is chemically bonded to M; and n is 0 or an integer from 1 to 4, and either 1 or 2 in a particular embodiment.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) as well as ring substituents in structures (Va–d) include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with formula (I) through (V) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in the formula (I) above and for the formulas/structures (II) through (V) below is bound to "M", and is independently selected from the group consisting of: any leaving group in one embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; with the proviso that in the embodiments described herein, the nitrogenous metallocene compound comprises at least one nitrogenous X group, preferably two nitrogenous X groups. A nitrogenous leaving group or nitrogenous X group is a chemical moiety that provides at least one chemical bond from a nitrogen to the metal center "M" of the metallocene catalyst compound, and desirably, only one bond to the metal center. In a more particular embodiment, the nitrogenous X group is selected from the group consisting of amides, amines, imines, nitriles and combinations thereof. In a more particular embodiment, the nitrogenous X group is described by the formula $-N(R^\alpha)_2$, wherein each $R^\alpha$ is independently selected from $C_1$ to $C_{10}$ alkyls, $C_6$ to $C_{20}$ aryls, $C_7$ to $C_{21}$, alkylaryls, $C_7$ to $C_{21}$, arylalkyls, and halide, carboxylate silyl or hydroxy-substituted versions thereof; wherein any two $R^\alpha$ groups may form a ring system of from 4 to 10 carbons that may also comprise an atom selected from Groups 13–16.

The "fluorided metallocene catalyst compound" of the present invention, the product of the fluoriding agent and the nitrogenous metallocene compound, is a metallocene comprising at least one fluoride leaving group, preferably two fluoride leaving groups (i.e. one or more X groups are fluoride ions).

Other non-limiting examples of X groups in formula (I) include amines, phosphines, ethers, carboxylates, dienes, hydrocarbon radicals having from 1 to 20 carbon atoms, fluorided hydrocarbon radicals (e.g., $—C_6F_5$ (pentafluorophenyl)), fluorided alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more X's form a part of a fused ring or ring system.

In another aspect of the invention, the metallocene catalyst component includes those of formula (I) where $Cp^A$ and $Cp^B$ are bridged to each other by at least one bridging group, (A), such that the structure is represented by formula (II):

These bridged compounds represented by formula (II) are known as "bridged metallocenes". $Cp^A$, $Cp^B$, M, X and n in structure (II) are as defined above for formula (I); and wherein each Cp ligand is chemically bonded to M, and (A) is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $—Si(R')_2Si(R'_2)—$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) may also be cyclic, comprising, for example 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formulae (I) and (II) are different from each other in one embodiment, and the same in another embodiment.

In yet another aspect of the invention, the metallocene catalyst components include bridged mono-ligand metallocene compounds (e.g., mono cyclopentadienyl catalyst components). In this embodiment, the at least one metallocene catalyst component is a bridged "half-sandwich" metallocene represented by the formula (III):

wherein $Cp^A$ is defined above and is bound to M; (A) is a bridging group bonded to Q and $Cp^A$; and wherein an atom from the Q group is bonded to M; and n is 0 or an integer from 1 to 3; 1 or 2 in a particular embodiment. In formula (III) above, $Cp^A$, (A) and Q may form a fused ring system. The X groups and n of formula (III) are as defined above in formula (I) and (II). In one embodiment, $Cp^A$ is selected from the group consisting of cyclopentadienyl, indenyl, tetrahydroindenyl, fluorenyl, substituted versions thereof, and combinations thereof.

In formula (III), Q is a heteroatom-containing ligand in which the bonding atom (the atom that is bonded with the metal M) is selected from the group consisting of Group 15 atoms and Group 16 atoms in one embodiment, and selected from the group consisting of nitrogen, phosphorus, oxygen or sulfur atom in a more particular embodiment, and nitrogen and oxygen in yet a more particular embodiment. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds comprising Group 15 and Group 16 atoms capable of bonding with M.

In yet another aspect of the invention, the at least one metallocene catalyst component is an unbridged "half sandwich" metallocene represented by the formula (IVa):

wherein $Cp^A$ is defined as for the Cp groups in (I) and is a ligand that is bonded to M; each Q is independently bonded to M; Q is also bound to $Cp^A$ in one embodiment; X is a leaving group as described above in (I); n ranges from 0 to 3, and is 1 or 2 in one embodiment; q ranges from 0 to 3, and is 1 or 2 in one embodiment. In one embodiment, $Cp^A$ is selected from the group consisting of cyclopentadienyl, indenyl, tetrahydroindenyl, fluorenyl, substituted version thereof, and combinations thereof.

In formula (IVa), Q is selected from the group consisting of ROO⁻, RO—, R(O)—, —NR—, —CR$_2$—, —S—, —NR$_2$, —CR$_3$, —SR, —SiR$_3$, —PR$_2$, —H, and substituted and unsubstituted aryl groups, wherein R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (IVb), such as described in, for example, U.S. Pat. No. 6,069,213:

wherein M, $Cp^A$, X and n are as defined above;

$Q_2GZ$ forms a polydentate ligand unit (e.g., pivalate), wherein at least one of the Q groups form a bond with M, and is defined such that each Q is independently selected from the group consisting of —O—, —NR—, —CR$_2$— and —S—; G is either carbon or silicon; and Z is selected from the group consisting of R, —OR, —NR$_2$, —CR$_3$, —SR, —SiR$_3$, —PR$_2$, and hydride, providing that when Q is —NR—, then Z is selected from the group consisting of —OR, —NR$_2$, —SR, —SiR$_3$, —PR$_2$; and provided that neutral valency for Q is satisfied by Z; and wherein each R is independently selected from the group consisting of $C_1$ to $C_{10}$ heteroatom containing groups, $C_1$ to $C_{10}$ alkyls, $C_6$ to $C_{12}$ aryls, $C_6$ to C12 alkylaryls, $C_1$ to $C_{10}$ alkoxys, and $C_6$ to $C_{12}$ aryloxys;

n is 1 or 2 in a particular embodiment; and

T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^AM(Q_2GZ)X_n$" groups, and is chemically bonded to the $Cp^A$ groups.

m is an integer from 1 to 7; m is an integer from 2 to 6 in a more particular embodiment.

In another aspect of the invention, the at least one metallocene catalyst component can be described more particularly in structures (Va), (Vb), (Vc), (Vd) (Ve) and (Vf):

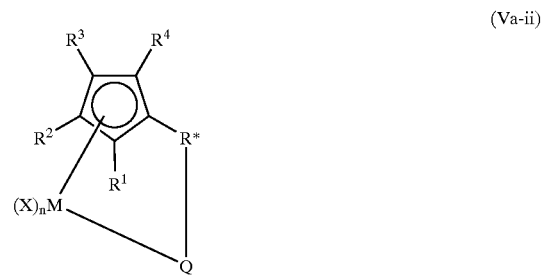

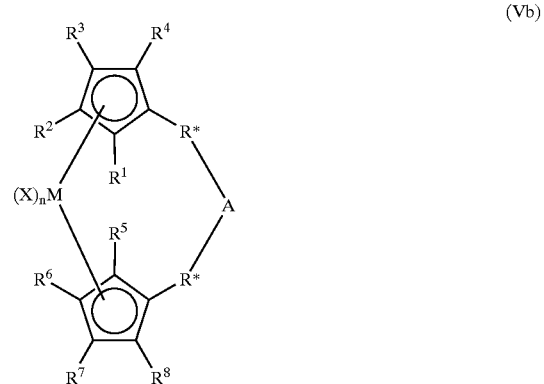

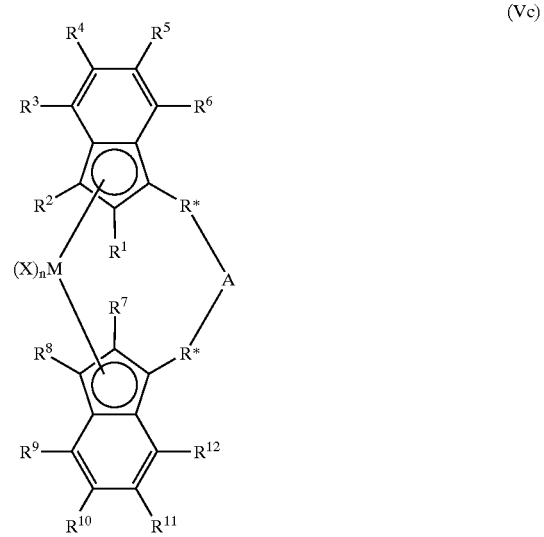

-continued

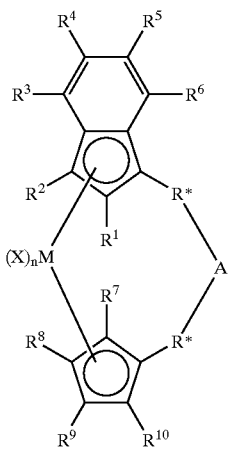
(Vd)

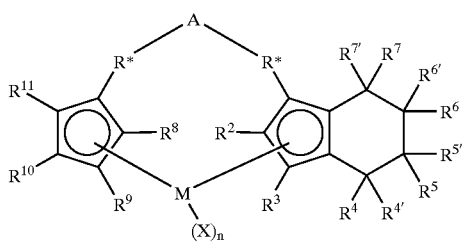
(Ve)

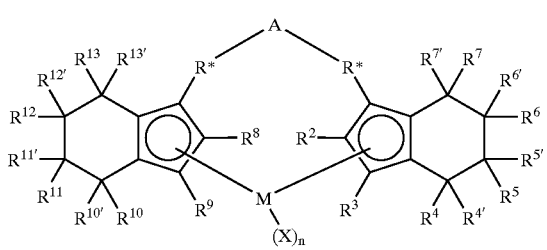
(Vf)

wherein in structures (Va) to (Vf) M is selected from the group consisting of Group 3 to Group 12 atoms, and selected from the group consisting of Group 3 to Group 10 atoms in a more particular embodiment, and selected from the group consisting of Group 3 to Group 6 atoms in yet a more particular embodiment, and selected from the group consisting of Group 4 atoms in yet a more particular embodiment, and selected from the group consisting of Zr and Hf in yet a more particular embodiment; and is Zr in yet a more particular embodiment;

wherein Q in (Va-ii) is selected from the group consisting of alkylenes, aryls, arylenes, alkoxys, aryloxys, amines, arylamines (e.g., pyridyl) alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorided alkyls, fluorided aryls, and fluorided alkylcarboxylates; wherein the saturated groups defining Q comprise from 1 to 20 carbon atoms in one embodiment; and wherein the aromatic groups comprise from 5 to 20 carbon atoms in one embodiment;

wherein each R* is independently: selected from the group consisting of hydrocarbylenes and heteroatom-containing hydrocarbylenes in one embodiment; and selected from the group consisting of alkylenes, substituted alkylenes and heteroatom-containing hydrocarbylenes in another embodiment; and selected from the group consisting of $C_1$ to $C_{12}$ alkylenes, $C_1$ to $C_{12}$ substituted alkylenes, and $C_1$ to $C_{12}$ heteroatom-containing hydrocarbylenes in a more particular embodiment; and selected from the group consisting of $C_1$ to $C_4$ alkylenes in yet a more particular embodiment; and wherein both R* groups are identical in another embodiment in structures (Vb–f);

A is as described above for (A) in structure (II), and more particularly, selected from the group consisting of a chemical bond, —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one embodiment; and selected from the group consisting of $C_5$ to $C_8$ cyclic hydrocarbons, —CH$_2$CH$_2$—, =CR$_2$ and =SiR$_2$ in a more particular embodiment; wherein and R is selected from the group consisting of alkyls, cycloalkyls, aryls, alkoxys, fluoroalkyls and heteroatom-containing hydrocarbons in one embodiment; and R is selected from the group consisting of $C_1$ to $C_6$ alkyls, substituted phenyls, phenyl, and $C_1$ to $C_6$ alkoxys in a more particular embodiment; and R is selected from the group consisting of methoxy, methyl, phenoxy, and phenyl in yet a more particular embodiment; wherein A may be absent in yet another embodiment, in which case each R* is defined as for $R^1$–$R^{13}$;

each X is as described above in (I);

n is an integer from 0 to 4, and from 1 to 3 in another embodiment, and 1 or 2 in yet another embodiment; and $R^1$ through $R^{13}$ are independently: selected from the group consisting of hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in one embodiment; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups in yet a more particular embodiment; wherein adjacent R groups may form a ring, either saturated, partially saturated, or completely saturated.

The structure of the metallocene catalyst component represented by (Va) may take on many forms such as disclosed in, for example, U.S. Pat. No. 5,026,798, U.S. Pat. No. 5,703,187, and U.S. Pat. No. 5,747,406, including a dimer or oligomeric structure, such as disclosed in, for example, U.S. Pat. No. 5,026,798 and U.S. Pat. No. 6,069,213.

In a particular embodiment of the metallocene represented in (Vd), $R^1$ and $R^2$ form a conjugated 6-membered carbon ring system that may or may not be substituted.

Process of Making a Fluorided Catalyst Compound

Methods of producing the fluorided metallocene catalyst compound from the nitrogenous metallocene compound are described herein. The process preferably includes contacting a nitrogenous metallocene compound with a fluoriding agent, e.g., a fluorided anhydrous acid, for a time sufficient to form a fluorided metallocene catalyst compound. For example, the nitrogenous leaving group may include or consist of an amide or an imide. The nitrogenous metallocene compound preferably has the same general formula as the desired fluorided metallocene compound, except that a nitrogen-containing group occupies the place of the fluorine or fluoride containing group.

In preferred embodiments, the fluoriding agent includes a fluorided acid compound. Preferably, the fluorided acid compound is anhydrous. More preferably, the fluorided acid compound is a Bronsted acid, e.g., the fluorided acid is capable of protonating the nitrogen of the nitrogenous metallocene compound. In one embodiment, the fluoriding agent is described by the general formula $HE_eF_fR'_r$, wherein H is hydrogen, F is fluorine, and E is a Group 13 to Group 16 atom, e is 0 or 1, and f is an integer from 1 to 20, preferably 1 to 10; and R' is a $C_1$ to $C_{10}$ alkyl or alkoxy group, r is an integer from 0 to 5. For example, the fluorided acid may be selected from the group consisting of HF, $HBF_4$, $HPF_6$, $HBF_4 \cdot OMe_2$ and combinations thereof and other ether complexes thereof. The fluorided acid compound of the invention preferably excludes compounds comprising a nitrile moiety, and in particular, excludes an aryl-nitrile moiety.

The nitrogenous metallocene compound that is contacted with the fluoriding agent may be initially charged in a solvent, e.g., mixed with the inert solvent to form a slurry or solution before being contacted with the fluoriding agent. In one embodiment, a desirable solvent is one that the fluorided metallocene is insoluble in. The inert solvent may include one of, or be a mixture of, aliphatic and aromatic hydrocarbons, ethers or a halogenated solvent. Suitable hydrocarbons include substituted and unsubstituted aliphatic hydrocarbons and substituted and unsubstituted aromatic hydrocarbons. Preferred solvents include hexane, heptane, octane, decane, toluene, xylene, dimethylether, diethylether, dibutylether, dichloromethane, chloroform and 1-chlorobutane. Typically, the fluorided metallocene product forms an insoluble precipitate in these solvents, allowed the solvent and other byproducts of the fluoriding process to be decanted from the solid fluorided metallocene.

Depending on the desired degree of substitution in the fluorided metallocene compound, the molar ratio of fluorine in the fluoriding agent to the nitrogenous metallocene compound is preferably from 1 equivalent to 20 equivalents; or from one equivalent to 5 equivalents, or three equivalents in another embodiment. For example, HF supplies one molar equivalent of fluoride, while $HBF_4$ supplies four equivalents. While excess fluorided anhydrous acid may not be detrimental, the molar ratio of the reactants is preferably essentially equal to the number of nitrogenous leaving groups to be substituted in the nitrogenous metallocene compound fluoride atoms. Preferably the number of anionic ligands to be substituted is 2.

As an example, particular elements of the fluoriding reaction of the present invention can be described as follows:

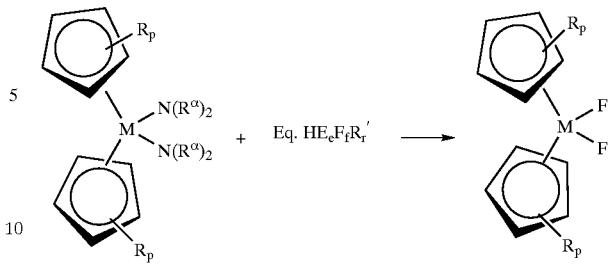

wherein R, R' and $R^\alpha$ are groups selected from hydrogen, hydrocarbons, heteroatom-containing hydrocarbons and halides as described above, p can be 0 (if no substituent groups are present on the Cp rings) or an integer from 1 to 5; adjacent R groups can form another ring system (e.g., to form a tetrahydroindenyl or indenyl group); and the other groups are defined as above; wherein "Eq." are the equivalents of fluoriding agent combined with the nitrogenous metallocene compound, Eq. ranging from 1 to 10 in one embodiment, and from 1 to 4 in a desirable embodiment; and wherein the equivalents of fluoride are Eq. x f. Thus, if Eq. is 2 and the fluoriding agent is $HBF_4$, the equivalent of fluoride is 8. The byproduct of the fluoriding agent typically forms an oil or solid that can be separated from the desired metallocene product by techniques common in the art.

The fluorided anhydrous acid or other fluoriding agent may be combined with the nitrogenous metallocene compound by mixing them together, such as, for example, by vigorously stirring them together. The mixing can be done at a variety of temperatures, including temperatures of from −80° C. to 120° C. Preferably the mixing is conducted at temperatures of from 0 to 100° C. At those temperatures, mixing times of 0.05 hour to 8 hours should be sufficient to provide a reaction that forms a fluorided metallocene compound, but routine experimentation may be desirable to arrive at an optimum temperature. Generally, the reaction time is dependent upon the amount of reactants reacted. Preferably, the reaction time is from 0.1 hour to 3 hours.

The solvent, along with reaction byproducts and any excess fluorinating agent, can be removed from the mixture in a conventional manner, such as by evaporation or filtering, to obtain the dry, fluorided metallocene compound. For example, the fluorided metallocene catalyst compound may be dried in the presence of magnesium sulfate. The filtrate, which contains the fluorided metallocene compound in high purity and yield, can without further processing be directly used in the polymerization of olefins if the solvent is a hydrocarbon.

Contacting the nitrogenous metallocene compound with the fluorided anhydrous acid preferably results in a fluorided metallocene catalyst compound yield of 50% or more. Preferably, the fluorided metallocene catalyst compound yield is 80% or more. More preferably, the fluorided metallocene catalyst compound yield is 90% or more.

Bimetallic Catalyst

The fluorided metallocene compound described herein may be used in polymerization processes, and in particular, olefin polymerization processes. In a particular embodiment, the fluorided metallocene compound may be used with no other catalyst component present, and in another embodiment, in combination with one or more catalyst compounds, to polymerize olefin monomers and form polyolefins. When the fluorided metallocene catalyst component is used with at least one other catalyst compound the composition is referred to as a 'bimetallic catalyst' or 'bimetallic catalyst composition'. When the bimetallic catalyst is combined with an activator, and optionally a support material, the composition is referred to as a bimetallic catalyst system.

The bimetallic catalyst systems of the invention are useful in producing bimodal polymer resins. As used herein, the term "bimodal," when used to describe a polymer or polymer composition (e.g., polyolefins such as polypropylene or polyethylene, or other homopolymers, copolymers or terpolymers) means "bimodal molecular weight distribution," which is understood as having the broadest definition persons in the pertinent art have given that term as reflected in printed publications and issued patents. For example, a single composition that includes polyolefins with at least one identifiable high molecular weight distribution and polyolefins with at least one identifiable low molecular weight distribution is considered to be a "bimodal" polyolefin, as that term is used herein. In a particular embodiment, other than having different molecular weights, the high molecular weight polyolefin and the low molecular weight polyolefin are essentially the same type of polymer, for example, polypropylene or polyethylene.

In a particular embodiment, the first catalyst component includes a Ziegler-Natta or a Group 15-containing catalyst component, from which a higher molecular weight resin (e.g., >ca 100,000 amu) can be produced. In a particular embodiment, the second catalyst component includes a fluorided metallocene component, from which a lower molecular weight resin (e.g., <ca 100,000 amu) can be produced. Accordingly, polymerization in the presence of the first and second catalyst components provides a bimodal polyolefin composition that includes a low molecular weight component and a high molecular weight component. The two catalyst components reside on a single support particle in a particular embodiment, and they can be affixed to the support in a variety of ways.

More particularly, as used herein, the terms bimetallic catalyst composition and bimetallic catalyst mean any composition, mixture or system that includes at least two different catalyst compounds, each having a different metal group. Preferably, each different catalyst compound resides on a single support particle, so that the bimetallic catalyst is a supported bimetallic catalyst. However, as used herein, the term bimetallic catalyst also broadly includes a system or mixture in which one of the catalysts (e.g., the first catalyst compound) resides on one collection of support particles, and another catalyst (e.g., the second catalyst compound) resides on another collection of support particles. Preferably, in that latter instance, the two supported catalysts are introduced to a single reactor, either simultaneously or sequentially, and polymerization is conducted in the presence of the bimetallic catalyst, i.e., the two collections of supported catalysts.

Although a bimetallic catalyst can include more than two different catalysts, a preferred embodiment of the bimetallic catalyst of the invention includes two catalyst components: a "first catalyst component" and the "second catalyst component," each discussed below.

Preferably, the first catalyst component includes a Ziegler-Natta-type or Group 15-containing catalyst component, from which a higher molecular weight resin can be produced. Preferably, the second catalyst component is a fluorided metallocene catalyst component, from which a lower molecular weight resin can be produced. Accordingly, polymerization in the presence of the first and second catalyst components provides a bimodal polyolefin composition that includes a low molecular weight component and a high molecular weight component. Preferably, the two catalyst components reside on a single support particle, and they can be affixed to the support in a variety of ways. Preferably, an "silica" is prepared as described herein; the first catalyst component is a non-metallocene compound that is first combined with the silica, to provide a supported non-metallocene composition; the supported non-metallocene composition is combined with the second catalyst component, e.g., a fluorided metallocene, resulting in a fluorided bimetallic catalyst composition having productivity when used in production of a bimodal polyolefin composition. Ziegler-Natta catalyst components are well known in the art and described, for example, in ZIEGLER CATALYSTS 363–386 (G. Fink, R. Mulhaupt and H. H. Brintzinger, eds., Springer-Verlag 1995). Examples of such catalysts include those comprising $TiCl_4$ and other such transition metal oxides and chlorides.

An embodiment of preparing the first catalyst component such as a Ziegler-Natta component is described. The first catalyst component is combined with a support material in one embodiment, either with or without the second catalyst component. The first catalyst component can be combined with, placed on or otherwise affixed to a support in a variety of ways. In one of those ways, a slurry of the support in a suitable non-polar hydrocarbon diluent is contacted with an organomagnesium compound, which then dissolves in the non-polar hydrocarbon diluent of the slurry to form a solution from which the organomagnesium compound is then deposited onto the carrier. The organomagnesium compound can be represented by the formula RMgR', where R' and R are the same or different $C_2$–$C_{12}$ alkyl groups, or $C_4$–$C_{10}$ alkyl groups, or $C_4$–$C_8$ alkyl groups. In at least one specific embodiment, the organomagnesium compound is dibutyl magnesium. In one embodiment, the amount of organomagnesium compound included in the silica slurry is only that which will be deposited, physically or chemically, onto the support, for example, being bound to the hydoxyl groups on the support, and no more than that amount, since any excess organomagnesium compound may cause undesirable side reactions. Routine experimentation can be used to determine the optimum amount of organomagnesium compound. For example, the organomagnesium compound can be added to the slurry while stirring the slurry, until the organomagnesium compound is detected in the support solvent. Alternatively, the organomagnesium compound can be added in excess of the amount that is deposited onto the support, in which case any undeposited excess amount can be removed by filtration and washing. The amount of organomagnesium compound (moles) based on the amount of dehydrated silica (grams) generally range from 0.2 mmol/g to 2 mmol/g in a particular embodiment.

Optionally, the organomagnesium compound-treated slurry is contacted with an electron donor, such as tetraethylorthosiloxane (TEOS) or an organic alcohol R"OH, where R" is a $C_1$–$C_{12}$ alkyl group, or a $C_1$ to $C_8$ alkyl group, or a $C_2$ to $C_4$ alkyl group. In a particular embodiment, R"OH is n-butanol. The amount of alcohol used in an amount effective to provide an R"OH:Mg mol/mol ratio of from 0.2 to 1.5, or from 0.4 to 1.2, or from 0.6 to 1.1, or from 0.9 to 1.0.

The organomagnesium and alcohol-treated slurry is contacted with a non-metallocene transition metal compound. Suitable non-metallocene transition metal compounds are compounds of Group 4 and 5 metals that are soluble in the non-polar hydrocarbon used to form the silica slurry in a particular embodiment. Suitable non-metallocene transition metal compounds include, for example, titanium and vanadium halides, oxyhalides or alkoxyhalides, such as titanium tetrachloride (TiCl$_4$), vanadium tetrachloride (VCl$_4$) and vanadium oxytrichloride (VOCl$_3$), and titanium and vanadium alkoxides, wherein the alkoxide moiety has a branched or unbranched alkyl group of 1 to 20 carbon atoms, preferably 1 to 6 carbon atoms. Mixtures of such transition metal compounds may also be used. The amount of non-metallocene transition metal compound used is sufficient to give a transition metal to magnesium mol/mol ratio of from 0.3 to 1.5, or from 0.5 to 0.8. The diluent can then be removed in a conventional manner, such as by evaporation or filtering, to obtain the dry, supported first catalyst component.

Another embodiment of the first catalyst component of the present invention includes the use of so called "Group 15-containing" catalyst components. Generally, "Group 15-containing catalyst components", as referred to herein, include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893 454; EP A1 0 894 005; U.S. Pat. No. 5,318,935; U.S. Pat. No. 5,889,128 U.S. Pat. No. 6,333,389 B2 and U.S. Pat. No. 6,271,325 B1.

In one embodiment, the Group 15-containing catalyst components useful in the present invention include Group 4 imino-phenol complexes, Group 4 bis(amido) complexes, and Group 4 pyridyl-amide complexes that are active towards olefin polymerization to any extent.

The Group 15-containing catalyst component may be more particularly described by the following formula (VI):

$$\beta_b(\alpha)_a\gamma_g MX_n \quad (VI)$$

wherein β and γ are groups that each comprise at least one Group 14 to Group 16 atom; and β (when present) and γ are groups bonded to M through between 1 and 4 Group 14 to Group 16 atoms, at least two atoms being Group 15-containing atoms;

more particularly, β and γ are groups selected from Group 14 and Group 15-containing (and their non-valent equivalents when not linked by a group α): alkyls, aryls, alkylaryls, and heterocyclic hydrocarbons, and chemically bonded combinations thereof in one embodiment; and selected from Group 14 and Group 15-containing: C$_1$ to C$_{10}$ alkyls, C$_6$ to C$_{12}$ aryls, C$_6$ to C$_{18}$ alkylaryls, and C$_4$ to C$_{12}$ heterocyclic hydrocarbons, and chemically bonded combinations thereof in a more particular embodiment; and selected from C$_1$ to C$_{10}$ alkylamines, C$_1$ to C$_{10}$ alkoxys, C$_6$ to C$_{20}$ alkylarylamines, C$_6$ to C$_{18}$ alkylaryloxys, and C$_4$ to C$_{12}$ nitrogen containing heterocyclic hydrocarbons, and C$_4$ to C$_{12}$ alkyl substituted nitrogen containing heterocyclic hydrocarbons and chemically bonded combinations thereof in yet a more particular embodiment; and selected from anilinyls, pyridyls, quinolyls, pyrrolyls, pyrimidyls, purinyls, imidazyls, indolyls, C$_1$ to C$_6$ alkyl substituted groups selected from anilinyls, pyridyls, quinolyls, pyrrolyls, pyrimidyls, purinyls, imidazyls, indolyls; C$_1$ to C$_6$ alkylamine substituted groups selected from anilinyls, pyridyls, quinolyls, pyrrolyls, pyrimidyls, purinyls, imidazyls, indolyls, amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, and chemically bonded combinations thereof in yet a more particular embodiment;

α is a linking (or "bridging") moiety that, when present, forms a chemical bond to each of β and γ, or two γ's, thus forming a "γαγ" or "γαβ" ligand bound to M; α may also include a Group 14 to Group 16 atom which may be bonded to M through the Group 14 to Group 16 atom in one embodiment; and more particularly, α is a divalent bridging group selected from alkylenes, arylenes, alkenylenes, heterocyclic arylenes, alkylarylenes, heteroatom containing alkylenes, heteroatom containing alkenylenes and heterocyclic hydrocarbonylenes in one embodiment; and selected from C$_1$ to C$_{10}$ alkylenes, C$_2$ to C$_{10}$ alkenylenes, C$_6$ to C$_{12}$ arylenes, C$_1$ to C$_{10}$ divalent ethers, C$_6$ to C$_{12}$ O- or N-containing arylenes, C$_2$ to C$_{10}$ alkyleneamines, C$_6$ to C$_{12}$ aryleneamines, and substituted derivatives thereof in yet a more particular embodiment;

a is 0 or 1;

b is an integer from 0 to 2;

g is an integer from 1 to 2; wherein in one embodiment, a is 1, b is 0 and g is 2;

M is selected from Group 3 to Group 12 atoms in one embodiment; and selected from Group 3 to Group 10 atoms in a more particular embodiment; and selected from Group 3 to Group 6 atoms in yet a more particular embodiment; and selected from Ni, Cr, Ti, Zr and Hf in yet a more particular embodiment; and selected from Zr and Hf in yet a more particular embodiment;

each X is as defined above; and n is an integer from 0 to 4 in one embodiment; and an integer from 1 to 3 in a more particular embodiment; and an integer from 2 to 3 in yet a more particular embodiment.

As used herein, "chemically bonded combinations thereof" means that adjacent groups, (β and γ groups) may form a chemical bond between them; in one embodiment, the β and γ groups are chemically bonded through one or more α groups there between.

As used herein, the terms "alkyleneamines", "aryleneamines", describe alkylamines and arylamines (respectively) that are deficient by two hydrogens, thus capable of forming chemical bonds with two adjacent γ groups, or adjacent β and γ groups. Thus, an example of an alkyleneamine is —CH$_2$CH$_2$N(CH$_3$)CH$_2$CH$_2$— and —CH$_2$CH$_2$N(H)CH$_2$CH$_2$— and an example of a heterocyclic hydrocarbylene or aryleneamine is —C$_5$H$_3$N— (divalent pyridine). An "alkylene-arylamine" is a group such as, for example, —CH$_2$CH$_2$(C$_5$H$_3$N)CH$_2$CH$_2$—.

Non-limiting examples of the Group 15-containing catalyst component are represented by the structures (VII), (VIII), and (IX) (where "N" is nitrogen):

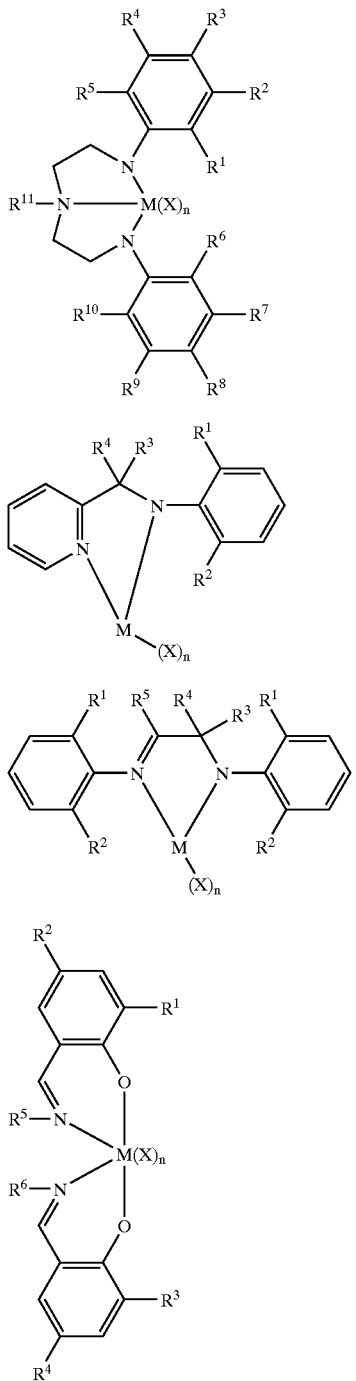

wherein in structures (VII) through (IX) M is selected from Group 4 atoms in one embodiment; and M is selected from Zr and Hf in a more particular embodiment; and wherein $R^1$ through $R^{11}$ in structures (VII) through (IX) are selected from hydride, fluorine radical, chlorine radical, bromine radical, methyl, ethyl, n-propyl, isopropyl, n-butyl, isobutyl, tert-butyl and phenyl; and X is selected from fluorine ion, chlorine ion, bromine ion, methyl, phenyl, benzyl, phenyloxy and benzyloxy; and n is an integer ranging from 0 to 4, and from 2 to 3 in a more particular embodiment.

The Group 15-containing catalyst components of the invention are prepared by methods known in the art, such as those disclosed in, for example, EP 0 893 454 A1, U.S. Pat. No. 5,889,128, U.S. Pat. No. 6,333,389 B2 and WO 00/37511.

Various methods of affixing two different catalyst components (albeit a different combination of catalysts) to a support can be used. In general, one procedure for preparing a supported bimetallic catalyst can include providing a supported first catalyst component, contacting a slurry that includes the first catalyst component in a non-polar hydrocarbon with a solution that includes the second catalyst component, which may also include an activator, and drying the resulting product that includes the first and second catalyst components and recovering a bimetallic catalyst composition.

Support

In certain embodiments, an unsupported version of the fluorided catalyst described herein can be used in a polymerization process, i.e., in which the monomers are contacted with a fluorided catalyst that is not supported. In other embodiments, a supported version of the fluorided catalyst can be used.

In one embodiment, the support useful in the present invention is prepared by heating support particles at a dehydration temperature of at least 800° C. or more, resulting in an support having a modified chemical structure. In another embodiment, the support is heated or "calcined" at a temperature between 800° C. and 1000° C., and between 800° C. and 900° C. in another embodiment. In another embodiment, increased catalyst productivity is achieved when the support is combined with the other parts of the bimetallic catalyst discussed herein, to form a supported bimetallic catalyst, which is then contacted with monomers during polymerization to produce a bimodal polyolefin compositions.

In one or more specific embodiments, an support is first prepared, preferably in the manner described below; then that support is treated (e.g., combined with ingredients that form the first catalyst) to provide a supported catalyst that includes the first catalyst component. In specific embodiments, that supported first catalyst is then treated in the presence of the second catalyst component to provide a supported bimetallic catalyst.

An aspect of one or more specific embodiments of the invention is the preparation of the support. As evidenced by experimental data, described in the examples below, heating a support at a dehydration temperature of at least 800° C. provides an support, e.g., silica, which provides surprisingly improved results over support that is dehydrated at lower temperatures, i.e., below 800° C., even slightly lower temperatures, e.g., 760° C. While not immediately apparent from the enhancement procedure itself, it is contemplated that the heat treatment results in an actual chemical change in the support structure itself, which only reveals its beneficial structure when combined with a first and second catalyst components described herein, and placed in the context of an actual polymerization. For example, when the silica is combined with both the first catalyst component and the second catalyst component to form a supported bimetallic catalyst composition, that supported bimetallic catalyst composition, including the silica, has been discovered as having desirably high productivity when used in a polymerization process for making bimodal polyolefin in a single reactor. For example, a productivity of at least 3000 grams polymer/gram catalyst can be achieved. More preferably, the bimetallic catalyst that includes the support has a productivity of at least 3500 grams polymer/gram catalyst. Even more preferably yet, a bimetallic catalyst having the support has a productivity of at least 4000 grams polymer/gram catalyst. Other specific embodiments of the invention include bimetallic catalysts with productivities of 4500 grams polymer/gram catalyst and above, 5000 grams polymer/gram catalyst and above, or even 6000 grams polymer/gram catalyst and above.

The term "support," discussed herein, also referred to interchangeably as a carrier or supports (plural), refers to any solid, particulate, porous material to which the bimetallic catalysts described herein can be affixed or otherwise reside. The support is preferably an inorganic material such as silicon oxide (silica) or aluminum oxide. The support material can be a dry powder, and in certain embodiments has an average particle size of from 1 to 500 μm, or from 10 to 250 μm, and from 10 and 35 μm in another embodiment, and from 10 and 30 μm in yet another embodiment. The surface area of the support may range up to 600 m$^2$/g, and from greater than 3 m$^2$/g in another embodiment.

A preferred support is an amorphous high surface area silica, such as Davison 952 or Sylopol® 955, sold by Davison Chemical Division of W. R. Grace and Company. Those silicas are in spherical form, prepared by the spray drying process, with a surface area of 300 m$^2$/g and a pore volume of 1.65 cm$^3$/g.

The dehydrated support may then be combined with a non-polar hydrocarbon to form a support slurry, which can be stirred and optionally heated during mixing in one embodiment. However, the support, catalyst component and activator may be combined in any fashion.

A variety of non-polar hydrocarbons can be used to form the support slurry, but any non-polar hydrocarbon selected should remain in liquid form at all relevant reaction temperatures, and the ingredients used to form the first catalyst component should be at least partially soluble in the non-polar hydrocarbon. Accordingly, the non-polar hydrocarbon is considered to be a "solvent" herein, even though in certain embodiments the ingredients are only partially soluble in the hydrocarbon. For example, the organomagnesium compound, alcohol and transition metal compound of the first catalyst compound, described above, should be at least partially soluble, and preferably completely soluble, in that hydrocarbon solvent at the mixing temperatures described above.

Examples of suitable non-polar hydrocarbons include $C_4$–$C_{10}$ linear or branched alkanes, cycloalkanes and aromatics. More specifically, a non-polar alkane can be isopentane, hexane, isohexane, n-heptane, octane, nonane, or decane; a non-polar cycloalkane such as cyclohexane; or an aromatic such as benzene, toluene, or ethylbenzene. Mixtures of different non-polar hydrocarbons can also be used.

The support slurry can be heated both during and after mixing of the support particles with the non-polar hydrocarbon solvent, but at the point when either or both of the catalysts are combined with the support slurry, the temperature of the slurry should be sufficiently low so that neither of the catalysts are inadvertently activated. Thus, the temperature of the support slurry (e.g., silica slurry) is preferably maintained at a temperature below 90° C., e.g., from 25 to 70° C., or even more narrowly from 40 to 60° C.

Activator

As used herein, the term "activator" is defined to be any compound or combination of compounds, supported or unsupported, which can activate a single-site catalyst compound (e.g., metallocenes, Group 15-containing catalysts, etc.), such as by creating a cationic species from the catalyst component. Typically, this involves the abstraction of at least one leaving group (X group in the formulas/structures above) from the metal center of the catalyst component. The catalyst components of the present invention are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO"), and alkylaluminum compounds as activators, and/or ionizing activators (neutral or ionic) such as tri (n-butyl)ammonium tetrakis (pentafluorophenyl)boron and/or a trisperfluorophenyl boron metalloid precursors to activate desirable metallocenes described herein. MAO and other aluminum-based activators are well known in the art. Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391–1434 (2000). The activators may be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347–1374 (2000).

The aluminum alkyl ("alkylaluminum") activator may be described by the formula $AlR^§_3$, wherein $R^§$ is selected from the group consisting of $C_1$ to $C_{20}$ alkyls, $C_1$ to $C_{20}$ alkoxys, halogen (chlorine, fluorine, bromine) $C_6$ to $C_{20}$ aryls, $C_7$ to $C_{25}$ alkylaryls, and $C_7$ to $C_{25}$ arylalkyls. Non-limiting examples of aluminum alkyl compounds which may be utilized as activators for the catalyst precursor compounds for use in the methods of the present invention include trimethylaluminum, triethylaluminum, triisobutylaluminum, tri-n-hexylaluminum, tri-n-octylaluminum and the like.

Examples of neutral ionizing activators include Group 13 tri-substituted compounds, in particular, tri-substituted boron, tellurium, aluminum, gallium and indium compounds, and mixtures thereof. The three substituent groups are each independently selected from alkyls, alkenyls, halogen, substituted alkyls, aryls, arylhalides, alkoxy and halides. In one embodiment, the three groups are independently selected from halogen, mono or multicyclic (including halosubstituted) aryls, alkyls, and alkenyl compounds and mixtures thereof. In another embodiment, the three groups are selected from alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from alkyls having 1 to 4 carbon groups, phenyl, naphthyl and mixtures thereof. In yet another embodiment, the three groups are selected from highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

In another embodiment, the neutral tri-substituted Group 13 compounds are boron compounds such as a trisperfluorophenyl boron, trisperfluoronaphthyl boron, tris(3,5-di (trifluoromethyl)phenyl)boron, tris(di-t-butylmethylsilyl) perfluorophenylboron, and other highly fluorinated trisarylboron compounds and combinations thereof, and their aluminum equivalents. Other suitable neutral ionizing activators are described in U.S. Pat. No. 6,399,532 B1, U.S. Pat. No. 6,268,445 B1, and in 19 ORGANOMETALLICS 3332–3337 (2000), and in 17 ORGANOMETALLICS 3996–4003 (1998).

Illustrative, not limiting examples of ionic ionizing activators include trialkyl-substituted ammonium salts such as triethylammonium tetra(phenyl)boron, tripropylammonium tetra(phenyl)boron, tri(n-butyl)ammonium tetra(phenyl) boron, trimethylammonium tetra(p-tolyl)boron, trimethylammonium tetra(o-tolyl)boron, tributylammonium tetra (pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra(o-tolyl)boron and the like; N,N-dialkyl anilinium salts such as N,N-dimethylanilinium tetra(phenyl)boron, N,N-diethylanilinium tetra(phenyl)boron, N,N-2,4,6-pentamethylanilinium tetra(phenyl)boron and the like; dialkyl ammonium salts such as di-(isopropyl)ammonium tetra(pentafluorophenyl)boron, dicyclohexylammonium tetra(phenyl)boron and the like; triaryl carbonium salts (trityl salts) such as triphenylcarbonium tetra(phenyl)boron and triphenylcarbonium tetra(pentafluorophenyl)boron; and triaryl phosphonium salts such as triphenylphosphonium tetra(phenyl)boron, triphenylphosphonium tetra (pentafluorophenyl)boron, tri(methylphenyl)phosphonium tetra(phenyl)boron, tri(dimethylphenyl)phosphonium tetra (phenyl)boron and the like, and their aluminum equivalents.

In yet another embodiment of the activator of the invention, an alkylaluminum can be used in conjunction with a heterocyclic compound. The heterocyclic compound includes at least one nitrogen, oxygen, and/or sulfur atom, and includes at least one nitrogen atom in a particular embodiment. The heterocyclic compound includes 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituents groups may also be substituted with halogens, particularly fluorine or bromine, heteroatoms or the like. Non-limiting examples of hydrocarbon substituents of the heterocyclic compound include fluoride, chloride, bromide, methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl.

In yet another embodiment one or more positions on the heterocyclic compound are substituted with a halogen atom or a halogen atom containing group, for example a halogenated aryl group. In one embodiment the halogen is selected from chlorine, bromine and fluorine, and selected from fluorine and bromine in another embodiment, and the halogen is fluorine in yet another embodiment.

Non-limiting examples of heterocyclic compounds that may be utilized with the activator of the invention include substituted and unsubstituted pyrroles, imidazoles, pyrazoles, pyrrolines, pyrrolidines, purines, carbazoles, and indoles, phenyl indoles, 2,5-dimethyl pyrroles, 3-pentafluorophenyl pyrrole, 4,5,6,7-tetrafluoroindole or 3,4-difluoropyrroles.

In one embodiment, the heterocyclic compound described above is combined with an alkylaluminum or an alumoxane to yield an activator compound which, upon reaction with a catalyst component, for example a metallocene, produces an active polymerization catalyst. Non-limiting examples of suitable alkylaluminums include trimethylaluminum, triethylaluminum, triisobutylaluminum, tri-n-hexylaluminum, tri-n-octylaluminum, tri-iso-octylaluminum, triphenylaluminum, and combinations thereof.

Other activators include those described in WO 98/07515 such as tris (2,2',2"-nonafluorobiphenyl) fluoroaluminate. Combinations of activators are also contemplated by the invention, for example, alumoxanes and ionizing activators in combinations. Other activators include aluminum/boron complexes, perchlorates, periodates and iodates including their hydrates; lithium (2,2'-bisphenyl-ditrimethylsilicate) .4THF; silylium salts in combination with a non-coordinating compatible anion. Also, methods of activation such as using radiation, electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in for example, U.S. Pat. Nos. 5,849,852, 5,859,653 and 5,869,723 and WO 98/32775.

In general, the activator and catalyst component(s) are combined in mole ratios of activator to catalyst component from 1000:1 to 0.1:1, and from 300:1 to 1:1 in another embodiment, and from 150:1 to 1:1 in yet another embodiment, and from 50:1 to 1:1 in yet another embodiment, and from 10:1 to 0.5:1 in yet another embodiment, and from 3:1 to 0.3:1 in yet another embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 2,000:1 in yet another embodiment. When the activator is a neutral or ionic ionizing activator such as a boron alkyl and the ionic salt of a boron alkyl, the mole ratio of activator to catalyst component ranges from 0.5:1 to 10:1 in one embodiment, and from 1:1 to 5:1 in yet another embodiment.

Polymerization Process

The fluorided metallocene made using the process described herein may be advantageously used as part of a catalyst system for the polymerization of olefins. The catalyst system includes the fluorided metallocene catalyst compound and an activator, and also includes a support in a particular embodiment, and may also include a second catalyst compound to form a bimetallic catalyst system in another embodiment. Desirably, the fluorided metallocene catalyst compound is supported on the support material, and in a particular embodiment, the activator is also supported on the same support material. The components used to make the catalyst system may be combined in any desirable manner and/or order as is known in the art. The catalyst system described above is suitable for use in any olefin prepolymerization and/or polymerization process over a wide range of temperatures and pressures and other conditions. Suitable polymerization processes include solution, gas phase, slurry phase and a high pressure process, or a combination thereof. A desirable process is a gas phase or slurry phase polymerization of one or more olefins at least one of which is ethylene or propylene.

The temperatures at which polymerization takes place may be in the range of from −60° C. to 280° C. in one embodiment, and from 50° C. to 200° C. in another embodiment, and from 60° C. to 120° C. in yet another embodiment, and the pressures employed may be in the range from 1 atmosphere to 500 atmospheres or higher, or described another way, from 0.01 bar to 100 bar in one embodiment, and from 0.1 to 60 bar in yet another embodiment, and from 1 to 30 bar in yet another embodiment.

In one embodiment, the process of this invention is directed toward a solution, high pressure, slurry or gas phase polymerization process of one or more olefin monomers having from 2 to 30 carbon atoms, from 2 to 12 carbon atoms in another embodiment, and from 2 to 8 carbon atoms in yet another embodiment. The invention is particularly well suited to the polymerization of two or more olefin monomers of ethylene, propylene, 1-butene, 1-pentene, 4-methyl-1-pentene, 1-hexene, 1-octene and 1-decene.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In a desirable embodiment of the process of the invention, a copolymer of ethylene derived units is produced in a gas phase process, the comonomer being an α-olefin having from 4 to 15 carbon atoms in one embodiment, and from 4 to 12 carbon atoms in another embodiment, and from 4 to 8 carbon atoms in yet another embodiment.

In another embodiment of the process of the invention, ethylene or propylene is polymerized with at least two different comonomers, optionally one of which may be a diene, to form a terpolymer.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 200 atmospheres pressure in yet another embodiment, and up to 100 atmospheres in yet another embodiment, and up to 50 atmospheres in yet another embodiment.

Hydrogen gas is often used in olefin polymerization to control the final properties of the polyolefin, such as described in POLYPROPYLENE HANDBOOK 76–78 (Hanser Publishers, 1996). Using the catalyst system of the present invention, is known that increasing concentrations (partial pressures) of hydrogen increase the melt flow rate (MFR) and/or melt index (MI) of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in the polymerization process of the present invention is an amount necessary to achieve the desired MFR or MI of the final polyolefin resin. In one embodiment, the mole ratio of hydrogen to total monomer ($H_2$:monomer) is in a range of from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 5000 ppm, and up to 4000 ppm in another embodiment, and up to 3000 ppm in yet another embodiment, and between 50 ppm and 5000 ppm in yet another embodiment, and between 500 ppm and 2000 ppm in another embodiment.

In another embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using any suitable bridged metallocene-type catalysts such as described in, for example, U.S. Pat. No. 6,143,686, U.S. Pat. No. 6,143,911, U.S. Pat. No. 5,296,434 and U.S. Pat. No. 5,278,264.

Typically in a gas phase polymerization process a continuous cycle is employed wherein one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer.

Further, it is common to use a staged reactor employing two or more reactors in series, wherein one reactor may produce, for example, a high molecular weight component and another reactor may produce a low molecular weight component. In one embodiment of the invention, the polyolefin is produced using a staged gas phase reactor. This and other commercial polymerization systems are described in, for example, 2 METALLOCENE-BASED POLYOLEFINS 366–378 (John Scheirs & W. Kaminsky, eds. John Wiley & Sons, Ltd. 2000). Gas phase processes contemplated by the invention include those described in U.S. Pat. No. 5,627,242, U.S. Pat. No. 5,665,818 and U.S. Pat. No. 5,677,375, and European publications EP-A-0 794 200 EP-B1-0 649 992, EP-A-0 802 202 and EP-B-634 421. In another embodiment, a single reactor is employed.

The one or more reactor pressures in a gas phase process (either single stage or two or more stages) may vary from 100 psig (690 kPa) to 500 psig (3448 kPa), and in the range of from 200 psig (1379 kPa) to 400 psig (2759 kPa) in another embodiment, and in the range of from 250 psig (1724 kPa) to 350 psig (2414 kPa) in yet another embodiment.

The one or more reactor temperatures in the gas phase process may vary from 50° C. to 120° C., and from 60° C. to 115° C. in another embodiment, and in the range of from 70° C. to 110° C. in yet another embodiment, and in the range of from 70° C. to 95° C. in yet another embodiment. For purposes of this patent specification and appended claims the terms "polymerization temperature" and "reactor temperature" are interchangeable.

The gas phase reactor employing the catalyst system described herein is capable of producing from 500 lbs of polymer per hour (227 Kg/hr) to 200,000 lbs/hr (90,900 Kg/hr), and greater than 1000 lbs/hr (455 Kg/hr) in another embodiment, and greater than 10,000 lbs/hr (4540 Kg/hr) in yet another embodiment, and greater than 25,000 lbs/hr (11,300 Kg/hr) in yet another embodiment, and greater than 35,000 lbs/hr (15,900 Kg/hr) in yet another embodiment, and greater than 50,000 lbs/hr (22,700 Kg/hr) in yet another embodiment, and from 65,000 lbs/hr (29,000 Kg/hr) to 100,000 lbs/hr (45,500 Kg/hr) in yet another embodiment.

A slurry polymerization process generally uses pressures in the range of from 1 to 50 atmospheres and even greater and temperatures in the range of 0° C. to 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane or an isobutane medium is employed.

Another desirable polymerization technique of the invention is referred to as a particle form polymerization, or a slurry process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and 2 METALLOCENE-BASED POLYOLEFINS 322–332 (2000).

The slurry reactor employing the catalyst system described herein is capable of producing greater than 2000 lbs of polymer per hour (907 Kg/hr), and greater than 5000 lbs/hr (2268 Kg/hr) in another embodiment, and greater than 10,000 lbs/hr (4540 Kg/hr) in yet another embodiment. In another embodiment, the slurry reactor used in the process of the invention produces greater than 15,000 lbs of polymer per hour (6804 Kg/hr), and from 25,000 lbs/hr (11,340 Kg/hr) to 100,000 lbs/hr (45,500 Kg/hr) in yet another embodiment.

In one embodiment of the process of the invention, the slurry or gas phase process is operated in the presence of the fluorided metallocene catalyst system of the invention and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

In another embodiment, one or all of the catalysts are combined with up to 10 wt % of a metal stearate (support, catalyst compound and activator), and from 0.2 to 2.5 wt % in another embodiment, (preferably a aluminum stearate, more preferably aluminum distearate) based upon the weight of the catalyst system (or its components), any support and the stearate. In an alternate embodiment, a solution of the metal stearate is fed into the reactor. In another embodiment, the metal stearate is mixed with the catalyst and fed into the reactor separately. These agents may be mixed with the catalyst or may be fed into the reactor in a solution or a slurry with or without the catalyst system or its components.

In another embodiment, the supported catalyst(s) are combined with the activators and are combined, such as by tumbling and other suitable means, with up to 2 wt % of an antistatic agent or 'surface modifier', such as a methoxylated amine, an example of which is Kemamine AS-990 (ICI Specialties, Bloomington Del.). Such surface modifiers are described in WO 96/11960 and WO 96/11961. In yet another embodiment, these antistatic agents are absent from the fluorided metallocene catalyst system (support, catalyst compound and activator), and added to less than 2 wt % of the catalyst system in another embodiment, and less than 0.5 wt % of the catalyst system in another embodiment.

Polymer Product

The polymers produced by the processes described herein, utilizing the fluorided metallocene catalyst compound or bimetallic catalysts described herein, which are bimodal in one embodiment, can be used in a wide variety of products and end-use applications. The polymers produced by the process of the invention include linear low density polyethylene, elastomers, plastomers, high density polyethylenes, low density polyethylenes, medium density polyethylenes, polypropylene and polypropylene copolymers.

The polymers, typically ethylene based polymers, should have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.955 g/cc, yet even more preferably in the range from 0.910 g/cc to 0.955 g/cc, and most preferably greater than 0.915 g/cc, preferably greater than 0.920 g/cc, and most preferably greater than 0.925 g/cc.

The polymers can have a molecular weight distribution, a weight average molecular weight to number average molecular weight ($M_w/M_n$) of greater than 5 to 80, particularly greater than 10 to 60, more preferably greater than 15 to less than 55, and most preferably from 20 to 50.

The polymers made by the described processes can in certain embodiments have a melt index (MI) or ($I_2$) as measured by ASTM-D-1238-E (190/2.16) in the range from 0.01 dg/min to 1000 dg/min, more preferably from 0.01 dg/min to 100 dg/min, even more preferably from 0.02 dg/min to 50 dg/min, and most preferably from 0.03 dg/min to 5 dg/min.

Polymers made by the described processes can in certain embodiments have a melt index ratio ($I_{21}/I_2$) ($I_{21}$ is measured by ASTM-D-1238-F; 190/21.6) of from 40 to less than 500, more preferably from 60 to less than 200. Expressed differently, polymers made by the described processes can in certain embodiments have a melt index ratio ($I_{21}/I_2$) of from preferably greater than 40, more preferably greater than 50, even more preferably greater than 60, still even more preferably greater than 65 and most preferably greater than 70. In one or more other embodiments, the polymer of the invention may have a narrow molecular weight distribution and a broad composition distribution or vice-versa.

In certain embodiments, propylene based polymers can be produced using the processes described herein. These polymers include atactic polypropylene, isotactic polypropylene, hemi-isotactic and syndiotactic polypropylene. Other propylene polymers include propylene block or impact copolymers.

The polymers of the invention may be blended and/or coextruded with any other polymer. Non-limiting examples of other polymers include linear low density polyethylenes produced via conventional Ziegler-Natta and/or metallocene catalysis, elastomers, plastomers, high pressure low density polyethylene, high density polyethylenes, polypropylenes and the like.

Polymers produced by the process of the invention and blends thereof are useful in such forming operations as film, sheet, pipe and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

Example 1

$(PrCp)_2ZrF_2$ was prepared by adding 600 μL $HBF_4(Et_2O)$ to a yellow solution of $(PrCp)_2Zr(NMe_2)_2$ in 10 mL ether $(Et_2O)$ at −35° C. The reaction was allowed to warm to room temperature and was stirred 20 min. The solvent was evaporated in vacuo and 30 mL pentane was added. The pentane mixture was filtered, leaving a colorless solution and an off-white gooey residue. The pentane solution was evaporated in vacuo, leaving white, fluffy solid with a yield of 0.85 g (100%).

Example 2

Bridged $Me_3Cp(silacyclobutyl)CpMe_4ZrF_2$ was prepared by adding a solution of 8.0 g of bridged $Me_3Cp$ $(silacyclobutyl)CpMe_4Zr(NMe_2)_2$ to a solution of 2.0 grams of $HFBF_3$ in 100 ml of dimethyl ether. The organic layer was separated from the reaction mixture and the organic layer was dried, filtered and evaporated, leaving a white solid with a yield of 5.0 g (70.4%).

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

What is claimed is:

1. A process of producing a fluorided catalyst metallocene catalyst component comprising contacting a nitrogenous metallocene compound with a fluoriding agent comprising a Bronsted acid fluorided acid for a time sufficient to form a fluorided metallocene catalyst compound; wherein the nitrogenous metallocene compound comprises at least one nitrogenous leaving group "X", wherein X is described by the formula $-N(R^\alpha)_2$, wherein each $R^\alpha$ is independently selected from $C_1$ to $C_{10}$ alkyls, $C_6$ to $C_{20}$ aryls, $C_7$ to $C_{21}$ alkylaryls, $C_7$ to $C_{21}$ arylalkyls, and halide, carboxylate silyl or hydroxy-substituted versions thereof.

2. The process of claim 1, wherein the nitrogenous metallocene catalyst compound is described by the formulae

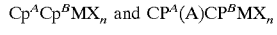

$Cp^A Cp^B MX_n$ and $CP^A(A)CP^B MX_n$ wherein M is a Group 4, 5 or 6 atom;
$Cp^A$ and $Cp^B$ are each bound to M and are the same or different and are selected from the group consisting of cyclopentadienyl, indenyl, tetrahydroindenyl, fluorenyl, and substituted derivatives of each;
(A) is a divalent bridging group bound to each of $Cp^A$ and $Cp^B$;
n is 0, 1 or 2; and
X is as defined.

3. The process of claim 1, wherein the fluoriding agent is a fluorided anhydrous acid.

4. The process of claim 1, wherein from 1 to 10 equivalents of fluoriding agent are contacted with the nitrogenous metallocene compound.

5. The process of claim 1, wherein the fluoriding agent is selected from the group consisting of HF, $REP_4$, $HPF_6$, $HBF_4OMe_2$ and combinations thereof.

6. The process of claim 2, wherein n is 2.

7. The process of claim 2, wherein the $Cp^A$ and $Cp^3$ are selected from the group consisting of substituted cyclopentadienyl and substituted tetrahydroindenyl; the substituent groups selected from the group consisting of $C_1$ to $C_{10}$ alkyls and $C_6$ to $C_{20}$ aryls.

8. The process of claim 6, wherein the substituent groups are selected from $C_1$ to $C_6$ alkyls.

9. The process of claim 2, wherein M is zirconium or hafnium.

10. The process of claim 1, wherein contacting the nitrogenous metallocene compound with the fluoriding agent subsequently forms an organic compound and a neutral nitrogenous compound and additionally comprising separating the neutral nitrogenous compound from the organic compound to form the fluorided metallocene catalyst compound.

11. The process of claim 2, wherein (A) is selected from divalent $C_1$ to $C_5$ hydrocarbons and silicon-containing hydrocarbons.

12. The process of claim 1, wherein contacting the nitrogenous metallocene compound with the fluoriding agent results in a fluorided metallocene compound yield of 50% or more.

13. The process of claim 1, wherein contacting the nitrogenous metallocene compound with the fluoriding agent results in a fluorided metallocene compound yield of 80% or more.

14. The process of claim 1, wherein contacting the nitrogenous metallocene compound with the fluoriding agent results in a fluorided metallocene compound yield of 90% or more.

15. The process of claim 2, wherein M is zirconium.

16. The process of claim 1, further comprising drying the fluorided metallocene compound in the presence of magnesium sulfate.

17. The process of claim 1, wherein contacting the nitrogenous metallocene compound with the fluoriding agent comprises contacting the nitrogenous metallocene compound with 2 or more equivalents of the fluoriding agent.

18. The process of claim 1, wherein contacting the nitrogenous metallocene compound with the fluoriding agent comprises contacting the nitrogenous metallocene compound with 2 or less equivalents of the fluoriding agent.

19. A process of producing a polyolefin comprising combining a metallocene catalyst system comprising a fluorided metallocene catalyst component and monomers selected from the group consisting of ethylene and $C_3$ to $C_{12}$ olefins; wherein the fluorided metallocene catalyst component is produced by contacting a nitrogenous metallocene compound with a Bronsted acid fluoriding agent for a time sufficient to form a fluorided metallocene catalyst compound, followed by isolation of the fluorided metallocene catalyst compound and formation of a metallocene catalyst system; wherein the nitrogenous metallocene compound comprises at least one nitrogenous leaving group "X", wherein X is described by the formula —$N(R^\alpha)_2$, wherein each $R^\alpha$ is independently selected from $C_1$ to $C_{10}$ alkyls, $C_6$ to $C_{20}$ aryls, $C_7$ to $C_{21}$ alkylaryls, and halide, carboxylate silyl or hydroxy-substituted versions thereof.

20. The process of claim 19, wherein the nitrogenous metallocene catalyst compound is described by the formulae

wherein M is a Group 4, 5 or 6 atom;

$Cp^A$ and $Cp^B$ are each bound to M and are the same or different and are selected from the group consisting of cyclopentadienyl, indenyl, tetrahydroindenyl, fluorenyl, and substituted derivatives of each;

(A) is a divalent bridging group bound to each of $Cp^A$ and $Cp^B$;

n is 0, 1 or 2; and

X is as defined.

21. The process of claim 19, wherein the fluoriding agent is a Bronsted acid comprising fluorine.

22. The process of claim 19, wherein the fluoriding agent is a fluorided anhydrous acid.

23. The process of claim 19, wherein the olefins are selected from the group consisting of ethylene and $C_3$ to $C_{12}$ α-olefins.

24. The process of claim 19, wherein the olefins and catalyst system are combined in a fluidized bed gas phase reactor at a polymerization temperature of from 50° C. to 120° C.

25. The process of claim 19, wherein the catalyst system further comprises a support material.

26. The process of claim 25, wherein the support material is silica calcined at a temperature of from 800° C. to 900° C.

27. The process of claim 26, wherein the catalyst system further comprises an alumoxane activator.

28. The process of claim wherein the metallocene catalyst system further comprises a Ziegler-Natta catalyst component or a Group 15-containing catalyst component.

29. The process of claim 19, wherein a polyolefin is produced having a density in the range of from 0.880 to 0.925 g/cm³.

30. The process of claim 28, wherein a bimodal polyolefin is produced having a density in the range of from 0.930 to 0.970 g/cm³.

31. A process of producing a fluorided catalyst metallocene catalyst component comprising contacting a nitrogenous metallocene compound with a fluoriding agent comprising a Bronsted acid fluorided acid for a time sufficient to form a fluorided metallocene catalyst compound; wherein contacting the nitrogenous metallocene compound with the fluoriding agent comprises contacting the nitrogenous metallocene compound with 2 or more equivalents of the fluoriding agent.

32. The process of claim 31, wherein the nitrogenous metallocene catalyst compound is described by the formulae

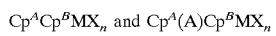

wherein M is a Group 4, 5 or 6 atom;

$Cp^A$ and $Cp^B$ are each bound to M and are the same or different and are selected from the group consisting of cyclopentadienyl, indenyl, tetrahydroindenyl, fluorenyl, and substituted derivatives of each;

(A) is a divalent bridging group bound to each of $Cp^A$ and $Cp^B$;

n is 0, 1 or 2; and

X is selected from the group consisting of amides, amines, imines, nitriles and combinations thereof.

33. The process of claim 32, wherein X is described by the formula —$N(R^\alpha)_2$, wherein each $R^\alpha$ is independently selected from $C_1$ to $C_{10}$ alkyls, $C_6$ to $C_{20}$ aryls, $C_7$ to $C_{21}$ alkylaryls, $C_7$ to $C_{22}$ arylalkyls, and halide, carboxylate silyl or hydroxy-substituted versions thereof; wherein any two $R^\alpha$ groups may form a ring system of from 4 to 10 carbons that may also comprise an atom selected from Groups 13–16.

34. The process of claim 31, wherein the fluoriding agent is a fluorided anhydrous acid.

35. The process of claim 31, wherein from 1 to 10 equivalents of fluoriding agent are contacted with the nitrogenous metallocene compound.

36. The process of claim 31, wherein the fluoriding agent is selected from the group consisting of HF, $HBF_4$, $HPF_6$, $OBF_4OMe_2$ and combinations thereof.

37. The process of claim 32, wherein n is 2.

38. The process of claim 32, wherein the $CP^A$ and $Cp^B$ are selected from the group consisting of substituted cyclopentadienyl and substituted tetrahydroindenyl; the substituent groups selected from the group consisting of $C_1$ to $C_{10}$ alkyls and $C_6$ to $C_{20}$ aryls.

39. The process of claim 31, wherein contacting the nitrogenous metallocene compound with the fluoriding agent subsequently forms an organic compound and a neutral nitrogenous compound and additionally comprising separating the neutral nitrogenous compound from the organic compound to form the fluorided metallocene catalyst compound.

40. The process of claim 31, wherein contacting the nitrogenous metallocene compound with the fluoriding agent results in a fluorided metallocene compound yield of 50% or more.

41. The process of claim 31, wherein contacting the nitrogenous metallocene compound with the fluoriding agent results in a fluorided metallocene compound yield of 80% or more.

42. The process of claim 31, wherein contacting the nitrogenous metallocene compound with the fluoriding agent results in a fluorided metallocene compound yield of 90% or more.

* * * * *